(12) United States Patent
Nielsen

(10) Patent No.: US 6,574,474 B1
(45) Date of Patent: Jun. 3, 2003

(54) LOAD BALANCING FOR CELLULAR AND WIRELESS SYSTEMS

(75) Inventor: Georgene M. Nielsen, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/315,902

(22) Filed: May 20, 1999

(51) Int. Cl.$^7$ ................................................. H04Q 7/20
(52) U.S. Cl. ........................ 455/436; 455/433; 455/453; 455/446
(58) Field of Search ................................. 455/453, 433, 455/422, 446, 445, 443, 439, 436

(56) References Cited

U.S. PATENT DOCUMENTS

| | | | |
|---|---|---|---|
| 4,670,899 A | * | 6/1987 | Brody et al. ................... 379/60 |
| 5,241,685 A | * | 8/1993 | Bodin et al. ................... 455/436 |
| 5,293,641 A | * | 3/1994 | Kallin et al. ................... 455/33.1 |
| 5,379,448 A | * | 1/1995 | Ames et al. ................... 455/33.2 |
| 5,983,102 A | * | 11/1999 | Gozes ........................... 455/432 |
| 6,009,331 A | * | 12/1999 | Ueda ............................ 455/450 |

* cited by examiner

Primary Examiner—Thanh Cong Le
Assistant Examiner—Lana Le
(74) Attorney, Agent, or Firm—Patton Boggs LLP

(57) ABSTRACT

A system for assign a cellular site to provide wireless telephone service to a mobile telephone set based upon two criteria. This invention assigns a cellular site to provide service based upon a primary criteria, such as signal strength between the cellular site and the mobile telephone set. A secondary criteria, such as load of the cellular site, is then checked to determine whether a threshold has been exceeded by the assignment of the cellular site to provide service. If the threshold for the secondary criteria is exceeded by the assignment, another cellular site is assigned to provide service to the mobile telephone set.

12 Claims, 4 Drawing Sheets

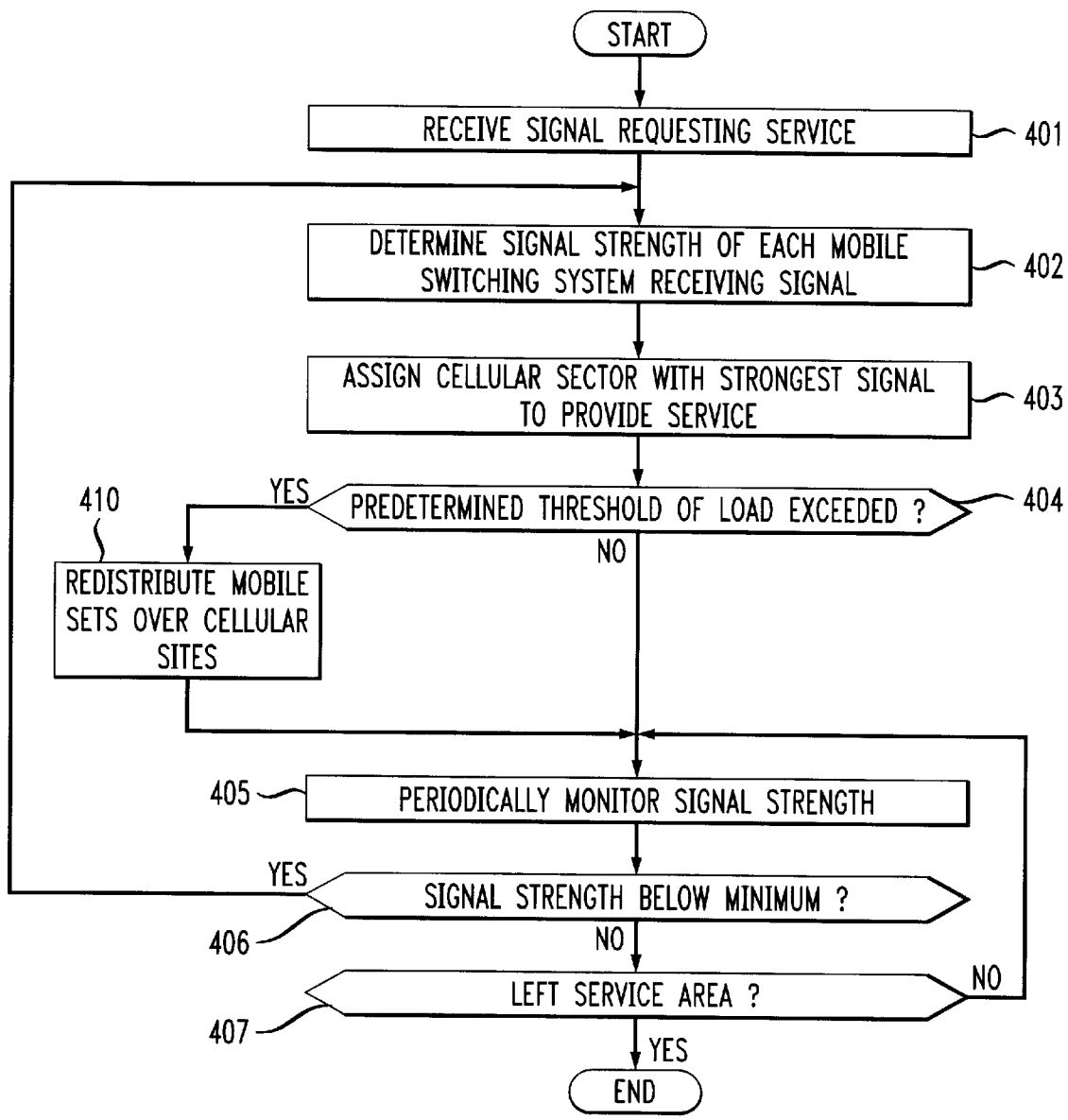

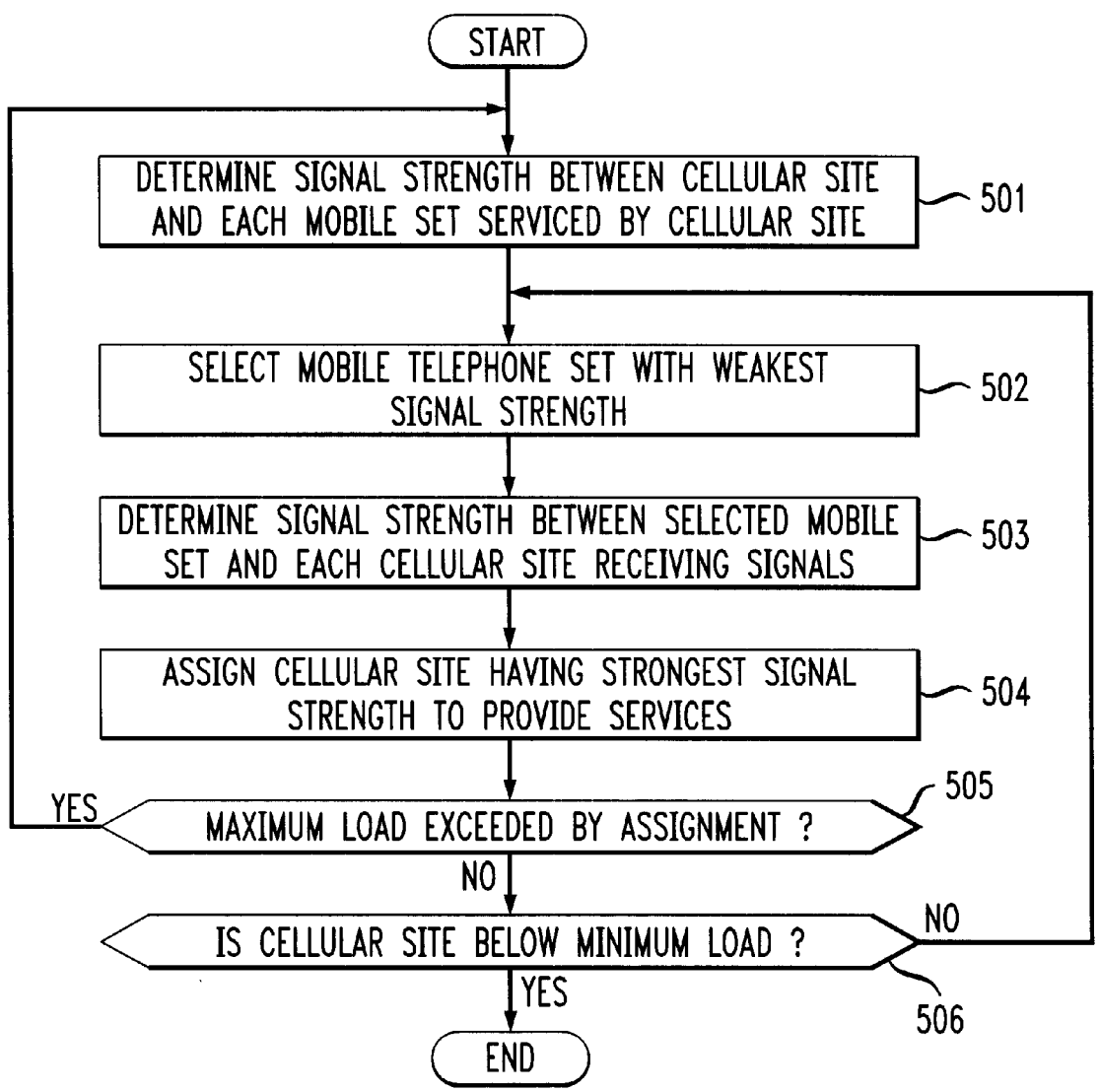

LOAD BALANCING FOR CELLULAR AND WIRELESS SYSTEMS

FIELD OF THE INVENTION

This invention relates to a mobile switching system that determines which cellular sector provides service to a mobile telephone set. More particularly, this invention relates to a process that uses a first criteria and a second criteria to determine which cellular sector provides service to a mobile telephone set. Still more particularly, this invention relates to determining which cellular sector will provide service based upon signal strength and load balancing.

PROBLEM

In today's society, wireless and/or cellular telephones are a common means of communication. Wireless and/or cellular telephone service is provided in the manner. A mobile telephone set transmits and receives radio signals from an antenna connected to a base station. For purposes of the present discussion, the term cellular site is hereinafter used to describe a base station and an antenna that provides telephone service to mobile telephones. A cellular sector is the term for a geographical area which is serviced by a cellular site. The base station is connected to a mobile switching system which is in turn connected to a telephone network. The base station converts between RF signals and telephonic signals to allow communication between the mobile telephone set and other telephone sets somewhere else in the telephone network.

In a typical wireless and/or cellular system, cellular sites are located in close proximity to one another and the cellular sectors of cellular sites may overlap in order to ensure that there is a cellular site that can provide telephone service to a mobile telephone set regardless of the location of the mobile set. Since the cellular sectors of cellular sites may overlap, the mobile switching system must determine which cellular site will provide service to the mobile telephone set. In a conventional wireless telephone system, the cellular site that provides service to a mobile telephone is determined by comparing the signal strength of signals between the mobile telephone set and each cellular site receiving signals from the set. The cellular site that has the strongest signal strength for signals from the mobile telephone set is assigned to provide service to the mobile set.

Resources in a cellular and/or wireless network are wasted because only one criteria, i.e. signal strength, is used to determine which cellular site provides service to mobile telephone sets. For example, a first and a second cellular site have overlapping cellular sectors. The first cellular site is providing a maximum number of mobile telephone sets with service because the signal strength between the mobile sets and the first cellular site is the strongest as compared with the signal strengths of other cellular sites and the mobile sets. Therefore, the first cellular site provides service to all of the mobile telephone sets.

Since the second cellular site does not have the strongest signal strength for any of the mobile telephones, it does not provide service to any of the mobile sets. If another mobile telephone set requests service and it is determined that the signal strength is strongest between the first cellular site and the requesting mobile set, the new mobile telephone set cannot be serviced because the first cellular site is already providing service to a maximum number of mobile telephones. From this example, it is obvious that there is a need for a system that determines which cellular site provides service to a mobile telephone set in a manner that reduces the waste of resources in a cellular/wireless system.

SOLUTION

The above and other problems are solved and an advance in the art is provided by a system that uses two criteria to determine which cellular site should provide service to a mobile telephone set. An advantage of this invention is that resources in the cellular/wireless system are not wasted. This allows the system to provide service to a greater number of mobile telephone sets at one time.

The system of the present invention is software or firmware executed by a processing unit in a mobile switching system to determine which cellular site will provide service to a mobile telephone set. The mobile switching system then signals the proper cellular site to provide service to the mobile unit.

The process is performed by the mobile switching system in the following manner. A signal requesting service is received from a mobile set. The mobile switching system assigns one cellular site to provide service to the mobile set based upon a first criteria. It is then determined whether the assignment of the cellular site to provide service exceeded a secondary criteria. If the secondary criteria is exceeded by the assignment, the process is repeated until a cellular site that meets both the primary and secondary criteria is assigned to provide service to the mobile set.

The following in an exemplary embodiment of a mobile switching system that has software that executes the above described process. In this exemplary embodiment, the primary criteria is signal strength between the mobile set and a cellular site. The secondary criteria is the load of the cellular site. For purposes of the present discussion, the load of a cellular site is the number of mobile telephone sets that are being provided service by the cellular site.

In the preferred exemplary embodiment, the process begins when a signal requesting telephone service is received from a mobile telephone set. The mobile switching system then determines the signal strength between the mobile telephone set and each cellular site that receives the signal. The cellular site with the strongest signal strength is then assigned to provide service to the mobile telephone set. The mobile switching system then determines whether the assignment of the mobile telephone set to the cellular site causes the load of the cellular site to exceed a predetermined number such as 80% capacity. If the load does exceed the predetermined capacity, the switching system attempts redistribute the mobile sets being serviced over the cellular sites to reduce the load of the cellular site.

Since the process is used to assign each mobile set as the set requests service, the load of each cellular site is continually balanced to prevent one cellular site from reaching capacity. This better allocates the resources in the system to allow the system to handle more mobile telephone sets at one time.

DESCRIPTION OF THE DRAWINGS

The above and other advantage of the present invention will be better understood from the detailed description and the following drawings:

FIG. 4 illustrating a flow chart of an alternative exemplary embodiment of the present invention; and FIG. 5 illustrating a flow chart of a process for redistributing mobile telephone service over cellular sites.

DETAILED DESCRIPTION

Figure 1:
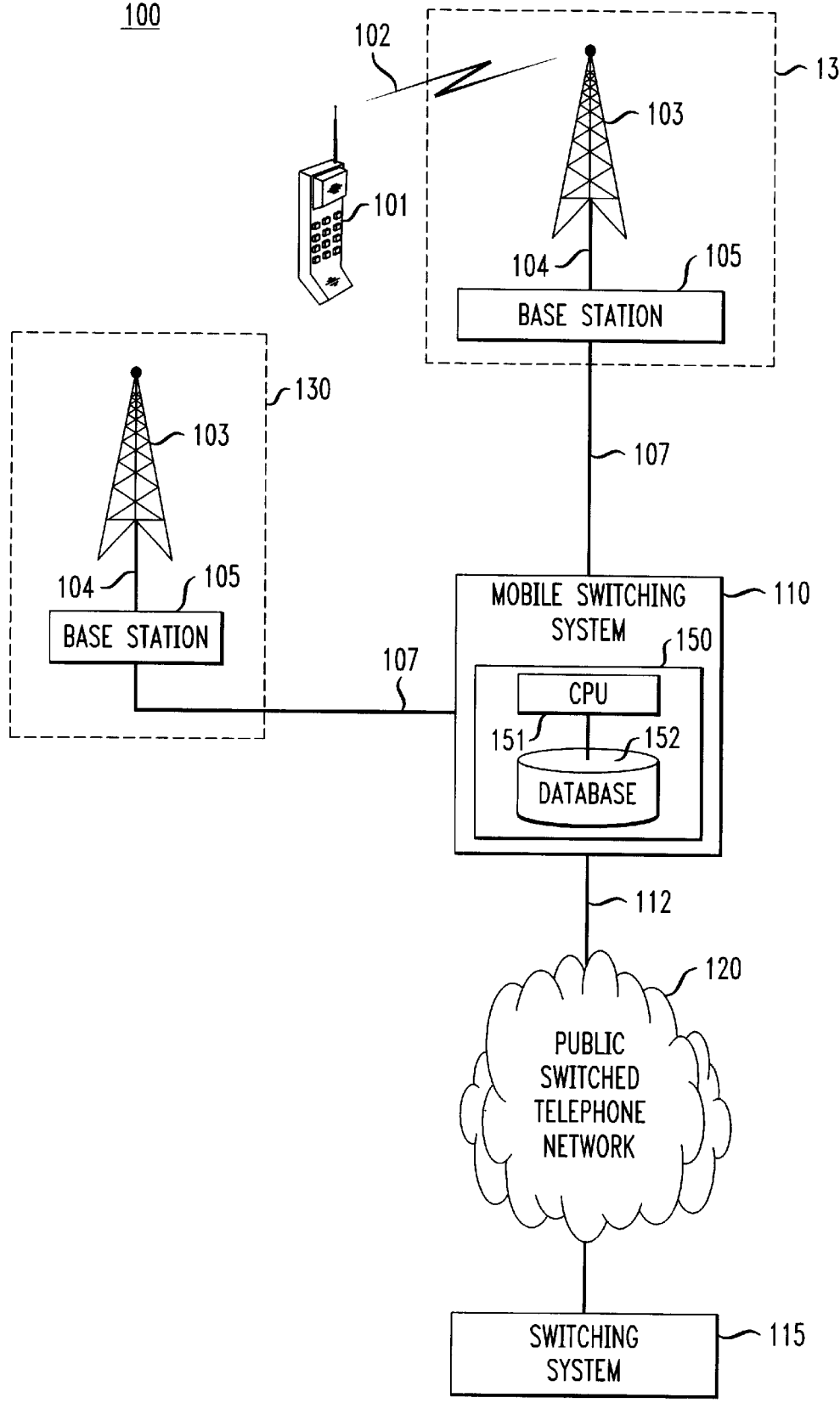
FIG. 1 illustrating a wireless and/or cellular telephone system.

FIG. 1 illustrates the components of wireless or cellular telephone system 100 that provides service to mobile telephone set 101. Radio Frequency (RF) signals 102 are transmitted between wireless mobile telephone set 101 and antenna 103 to establish a connection between telephone set 101 and telephone network 100. Antenna 103 is connected to base station 105 via path 104. For purposes of this discussion, the term cellular site refers to antenna 103 and base station 105. Base station 105 generates the signals needed to provide telephone service to mobile telephone set 101. Base station 105 is connected to mobile switching system 110 via path 107.

Mobile switching system 110 is a switching system that is connected to at least base station 105 and coordinates the transmission of radio signals from at least one base stations 105 to mobile telephone sets 101 to provide telephone service to a plurality of wireless caller telephone sets 101. Mobile switching system 110 has a controller 150 which comprises a processing unit 151 that executes instructions stored in a memory 152 to perform the functions of providing telephone service to wireless caller telephone sets 101. The provision of wireless telephone service by mobile switching system 110 is well known to those skilled in the art and only those processes needed to understand the present invention are discussed.

Mobile switching system 110 provides a connection for wireless telephone set 101 to non-wireless public switched telephone network 120 via path 112. Switching system 115 and mobile switching system 110 are connected by network 120 to complete telephone calls between wireless callers and non-wireless callers.

The present invention is software, firmware, or other device that defines how mobile switching system 110 determines which cellular site 130 provides service to a mobile telephone set 101. The process of the present invention uses two criteria to determine which cellular site provides service to a mobile telephone set 101. The use of two criteria better distributes a plurality of mobile telephone sets across a plurality of cellular sites 130 to allow more mobile telephone sets 101 to be serviced by network 100.

Figure 2:
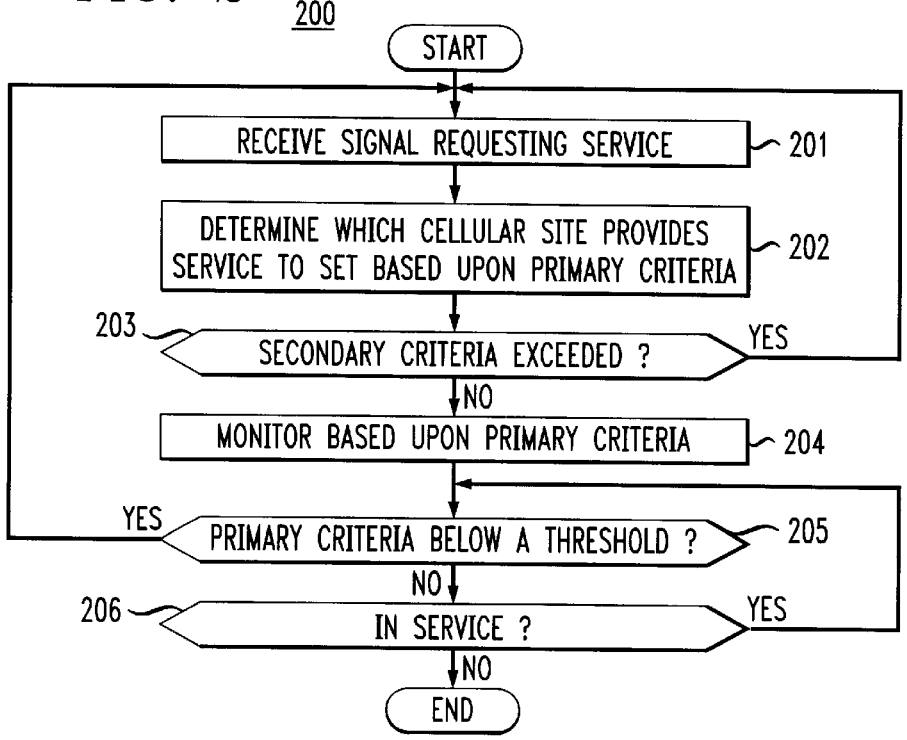
FIG. 2 illustrating a flow chart of an overview of the process of the present invention.

FIG. 2 illustrates process 200 in which two criteria are used to determine which cellular site 130 provides service to mobile hand set 101. Process 200 begins in step 201 in which a signal requesting cellular telephone service is received from mobile set 101. The signal may be received by one or more antenna 103 in more than one cellular site 130. In step 202, mobile switching system 110 determines which cellular sites 130 are able to provide wireless and/cellular service to mobile telephone set 101. Switching system 110 then assigns a cellular site 130 to provide service to mobile telephone set 101 based upon a first criteria. For example, cellular site 130 may be assigned based upon signal strength between mobile telephone set 101 and each cellular site 130 that receives the signal requesting service.

After the cellular site 130 has been assigned, it is determined whether a secondary criteria is exceeded by the assignment of cellular site 130 to provide telephone service to mobile set 101 in step 203. For example, mobile switching system 110 may determine whether the load of cellular sector 130 exceeds a predetermined threshold, such as 80% of capacity. If the secondary criteria is exceeded, then the process is repeated until a cellular site 130 that meets both criteria is found.

Once a cellular site 130 has been found that meets both the primary criteria and secondary criteria, the primary criteria is monitored in step 204. In step 205, it is determined whether the primary criteria has dropped below a certain threshold. For example, mobile switching system 110 may determine whether the signal strength between mobile telephone set 101 and selected cellular site 130 has dropped below a predetermined level. If the primary criteria has dropped below the certain threshold, process 200 is repeated from step 202. Otherwise, mobile switching system 110 determines whether mobile telephone set 101 is still receiving service in step 206. If mobile telephone set 101 is still receiving service steps 204–206 are repeated. Otherwise, process 200 ends.

Figure 3:
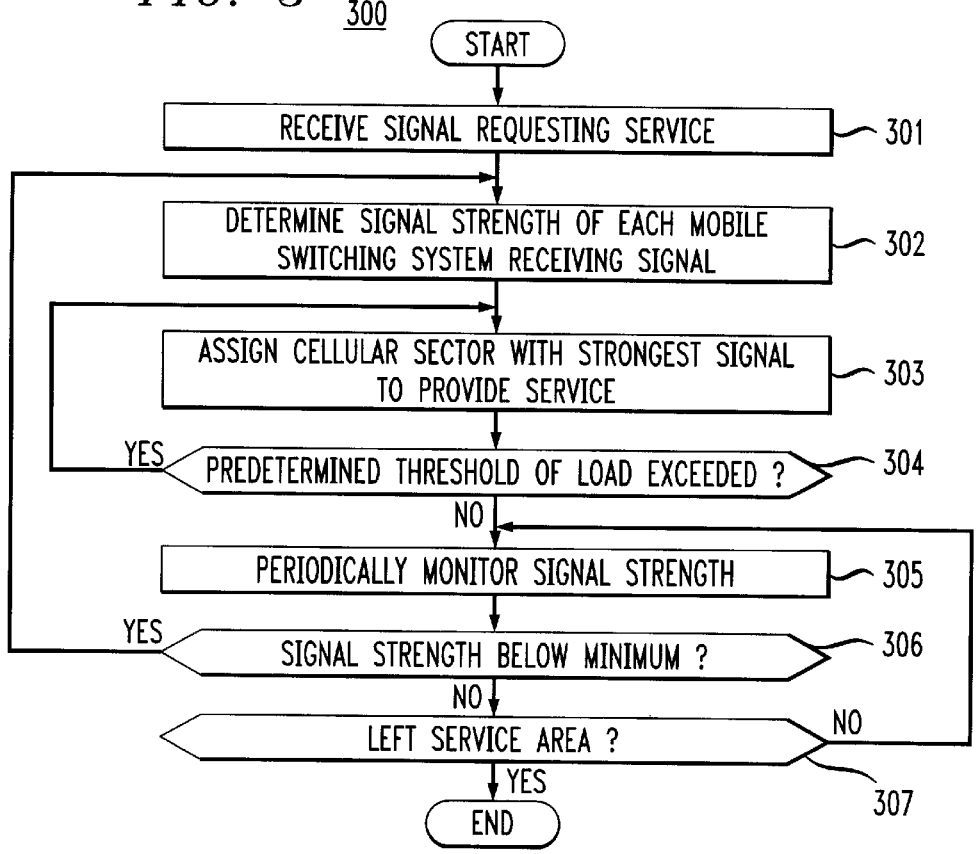
FIG. 3 illustrating a flow chart of a preferred exemplary embodiment of the process of the present invention.

FIG. 3 illustrate a preferred exemplary embodiment of a process 300 that is executed by mobile switching system 110 to determine which cellular site 130 provides service to a mobile telephone set 101. The process 300 is performed by controller 150 of mobile switching system 1 10 performing instruction stored in memory 15-. Process 300 balances the distribution of mobile telephones across the plurality of cellular sites 130 by assigning cellular sites 130 to service mobile telephone sets 101 based upon signal strength and the load of each cellular site. The advantage of process 300 is that since both criteria are used for every assignment, the mobile telephone sets 101 are more evenly distributed over wireless telephone network 100.

Process 300 begins in step 301 with a signal requesting service being received from a mobile telephone set 101. This signal is a typical RF signal requesting service that is conventional to those skilled in the art. In step 302, mobile switching system determines the signal strength between mobile telephone set 101 and each cellular sector 130 which received the request via antenna 103. The cellular site having the strongest signal strength is then assigned to provide service to mobile telephone set 101 in step 303. In step 304, mobile switching system 110 determines whether or not the load of assigned cellular sector 130 exceeds a predetermined threshold. The predetermined threshold is left to a designer of the system. However, one example of a threshold is 80% the maximum load of cellular sector 130.

If the predetermined threshold is exceeded, steps 303–304 are repeated. Otherwise, the signal strength between mobile telephone set 101 and assigned cellular site is periodically monitored in step 305. In step 306, it is determined if the signal strength has dropped below a predetermined minimum. The actual predetermined minimum is left to a designer of the system. If the signal strength is below the predetermined minimum, process 300 is repeated from step 302 to assign a new cellular site 130 to provide service to mobile telephone set 101. Otherwise, it is determined whether telephone set 101 has left the coverage area in step 307.

If mobile set 101 has not left the coverage area steps 305–307 are repeated. Otherwise, process 300 ends when telephone set 101 leaves the service area or ceases to transmit signals.

FIG. 4 illustrates process 400 which is an alternative exemplary embodiment of this invention in which signal strength and cellular site load are used to determine which cellular site 130 provides service to a mobile telephone set 101. Process 400 reduces the problem that one cellular site may be better suited to provide service to a mobile telephone set that arrives subsequently to other mobile telephone sets 101. For example, a first wireless set may be assigned to a cellular site before a second wireless set. However, the second wireless set may have a stronger signal strength. Therefore, it makes more sense for the cellular site to provide service to the second wireless set. Process 400 reduces this problem by redistributing the mobile telephone sets over cellular sites 130 when a limit for the secondary criteria is exceeded.

Process 400 begins in step 401 with a signal requesting service being received from a mobile telephone set 101. This signal is a typical RF signal requesting service that is conventional to those skilled in the art. In step 402, mobile switching system determines the signal strength between mobile telephone set 101 and each cellular sector 130 which received the request via antenna 103. The cellular site having the strongest signal strength is then assigned to provide service to mobile telephone set 101 in step 403. In step 404, mobile switching system 110 determines whether or not the load of assigned cellular sector 130 exceeds a predetermined threshold. The predetermined threshold is left to a designer of the system. However, one example of a threshold is 80% the maximum load of cellular sector 130.

If the predetermined threshold is exceeded, mobile switching system redistributes the mobile telephone sets 101 in step 410. FIG. 5 illustrates a process for redistributing mobile telephone sets 101 over cellular sites 130. Otherwise, the signal strength between mobile telephone set 101 and assigned cellular site is periodically monitored in step 405. In step 406, it is determined if the signal strength has dropped below a predetermined minimum. The actual predetermined minimum is left to a designer of the system. If the signal strength is below the predetermined minimum, process 400 is repeated from step 402 to assign a new cellular site 130 to provide service to mobile telephone set 101. Otherwise, it is determined whether telephone set 101 has left the coverage area in step 407.

If mobile set 101 has not left the coverage area steps 405–407 are repeated. Otherwise, process 400 ends when telephone set 101 leaves the service area or ceases to transmit signals.

FIG. 5 illustrates process 500 which redistributes assignments of which cellular sites 130 are providing service to each mobile telephone set 101. In step 501, mobile switching system 110 determines the signal strength between the cellular site 130 and each mobile telephone set 101 that is being provided service by the cellular sector 130. In step 502, the mobile telephone set 101 having the weakest signal strength with cellular site is selected. The weakest signal strength is used because it is probable that another cellular site 130 can provide service with at least an equal signal strength as the cellular site 130 currently providing service. The signal strength between the selected mobile telephone set 101 and each cellular site 130 receiving signals from the selected mobile telephone set 100 is determined in step 503. Another cellular site 130 having the strongest signal strength with selected mobile telephone set 101 is assigned to provide service in step 504. In step 505, mobile switching system 110 determines whether the assignment of cellular site 130 to provide service to mobile telephone 101 causes the load of cellular site 130 to exceed a predetermined maximum load. If the maximum load is exceeded, redistribution process 500 is performed upon cellular site 130. Otherwise, mobile switching system 110 determines whether the cellular site 130 that exceeded the maximum load has had the load reduced to a load that is below the maximum load in step 506. If the load of cellular site 130 has been reduced below the maximum load, process 500 ends. Otherwise, process 500 is repeated for the cellular site 130 from step 501.

The above is a description of a system for assign cellular site to provide wireless telephone service to mobile telephone sets using two criteria which include signal strength and load in a preferred embodiment. It is expected that those skilled in the art can and will design alternative systems that infringe on this invention as set forth in the claims below either literally or through the Doctrine of Equivalents.

What is claimed is:

1. A method, performed by a mobile switching system that provides cellular communication services to a plurality of mobile telephone sets via a plurality of cell sites, for selecting a one of said plurality of cell sites to provide service for a mobile telephone set, comprising the steps of:

receiving a request for service transmitted by said mobile telephone set;

assigning one of said plurality of cell sites to provide service to said mobile telephone set based upon a primary criteria that Is a function of the service provided to said mobile telephone set;

determining, upon provision of service to said mobile telephone set in said one of said plurality of cell sites, whether provision of service to said mobile telephone set causes a secondary criteria that is a function of the service provided to said plurality of mobile telephone sets to be exceeded and a cellular traffic load of said one of said plurality of cell sites to exceed a predetermined threshold;

determining a one of said plurality of cell sites having a second strongest signal strength responsive to said cellular traffic load of said one of said plurality of cell sites exceeding said predetermined threshold; and assigning, in response to a determination that said secondary criteria is exceeded, a second one of said plurality of cell sites to provide service to said mobile telephone set.

2. The method of claim 1 wherein said primary criteria is signal strength between said mobile telephone set and each of said plurality of cell sites.

3. The method of claim 1 wherein said step [assign] of assigning said one of said plurality of cell sites comprises the steps of:

determining a signal strength between said mobile telephone set and each of said plurality of cell sites that receive signals from said mobile telephone set; and assigning said one of said plurality of cell sites that has a strongest signal strength.

4. The method of claim 1 wherein said step of assigning a second one of said cell sites comprises the step of:

redistributing service for a plurality of mobile telephone sets being serviced by said one of said plurality of cell sites over said plurality of cell sites.

5. The method of claim 4 wherein said step redistributing service comprises the steps of:

1.) determining said signal strength between each of said plurality of mobile telephone sets and said one of said plurality of cell sites;

2.) determining which one of said plurality of mobile telephone sets has a weakest signal strength;

3.) determining signal strength between said one of said plurality of mobile telephone sets that has a weakest signal strength and each of said plurality of cell sites that receive signals from said one of said plurality of mobile telephone sets that has a weakest signal strength;

4.) selecting a second one of said plurality of cell sites that receive signals from said one of said plurality of mobile telephone sets that has a weakest signal strength to provide service to said one of said plurality of mobile telephone sets that has a weakest signal strength wherein said second one of said plurality of cell sites that receive signals from said one of said plurality of mobile telephone sets that has a weakest signal strength has a strongest signal strength between said one of said plurality of mobile telephone sets that has a weakest signal strength and said second one of said plurality of cell sites;

5.) determining whether selecting a second one of said plurality of cell sites that receive signals from said one of said plurality of mobile telephone sets that has a weakest signal strength causes the cellular traffic load of said subsequent one of said plurality of cell sites to exceed a predetermined cellular traffic threshold for said second one of said plurality of cell sites;

6.) repeating steps 3–5 responsive to a determination that said predetermined cellular traffic threshold for said second one of said plurality of cell sites is exceeded, 7.) determining whether said predetermined threshold is still exceeded by said one of said plurality of cell sites, and 8.) repeating steps 1–8 responsive to a determination that said secondary criteria is still exceeded in said one of said plurality of cell sites.

6. An apparatus in a mobile switching system that provides cellular communication services to a plurality of mobile telephone sets via a plurality of cell sites, for selecting a one of said plurality of cell sites to provide service for a mobile telephone set, comprising:

means for receiving a request for service transmitted by said mobile telephone set;

means for assigning one of said plurality of cell sites to provide service to said mobile telephone set based upon a primary criteria that is a function of the service provided to said mobile telephone set;

means for determining, upon provision of service to said mobile telephone set in said one of said plurality of cell sites, whether provision of service to said mobile telephone set causes a secondary criteria that is a function of the service provided to said plurality of mobile telephone sets to be exceeded and a cellular traffic load of said one of said plurality of cell sites to exceed a predetermined threshold;

means for determining a one of said plurality of cell sites having a second strongest signal strength responsive to said cellular traffic load of said one of said plurality of cell sites exceeding said predetermined threshold; and means for assigning, in response to a determination that said secondary criteria is exceeded, a second one of said plurality of cell sites to provide service to said mobile telephone set.

7. The apparatus of claim 6 wherein said primary criteria is signal strength between said mobile telephone set and each of said plurality of cell sites.

8. The apparatus of claim 7 wherein said means for assigning said one of said plurality of cell sites comprises:

means for determining a signal strength between said mobile telephone set and each of said plurality of cell sites that receive signals from said mobile telephone set; and means for assigning said one of said plurality of cell sites that has a strongest signal strength.

9. The apparatus of claim 6 wherein said means for assigning a second one of said cell sites comprises:

means for redistributing service for a plurality of mobile telephone sets being serviced by said one of said plurality of cell sites over said plurality of cell sites.

10. The apparatus of claim 9 wherein said means for redistributing service comprises:

means for determining said signal strength between each of said plurality of mobile telephone sets and said one of said plurality of cell sites;

means for determining which one of said plurality of mobile telephone sets has a weakest signal strength; and means for handing off said one of said plurality of mobile telephone sets that has a weakest signal strength, comprising:

means for determining signal strength between said one of said plurality of mobile telephone sets that has a weakest signal strength and each of said plurality of cell sites;

means for selecting a second one of said plurality of cell sites to provide service to said one of said plurality of mobile telephone sets that has a weakest signal strength wherein said subsequent one of said plurality of cell sites has a strongest signal strength between said one of said plurality of mobile telephone sets that has a weakest signal strength and said second one of said cell sites;

means for determining whether selecting a second one of said plurality of cell sites causes the load of said second one of said plurality of cell sites to exceed said predetermined cellular traffic threshold for said second one of said plurality of cell sites.

11. The apparatus of claim 10 wherein said means for redistributing service further comprises:

means for re-enabling said means for handing off to hand off said one of said plurality of mobile telephone sets that has a weakest signal strength to another one of said plurality of cell sites in response to a determination that said predetermined cellular traffic threshold for said second one of said plurality of cell sites is exceeded.

12. The apparatus of claim 11 wherein said means for redistributing service further comprises:

means for determining whether said predetermined threshold is still exceeded by said second one of said plurality of cell sites, and means, responsive to a determination that said secondary criteria is still exceeded in said one of said plurality of cell sites, for activating said means for selecting a second one of said cell sites.

* * * * *